Sept. 8, 1931.    L. SCHECHTER    1,822,241
GASOLINE DISPENSER
Filed Sept. 29, 1930    4 Sheets-Sheet 3
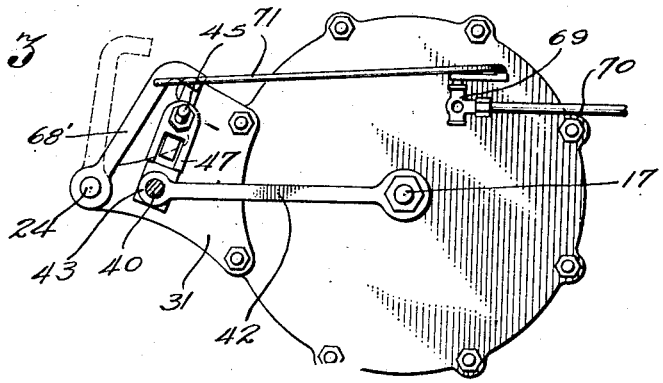
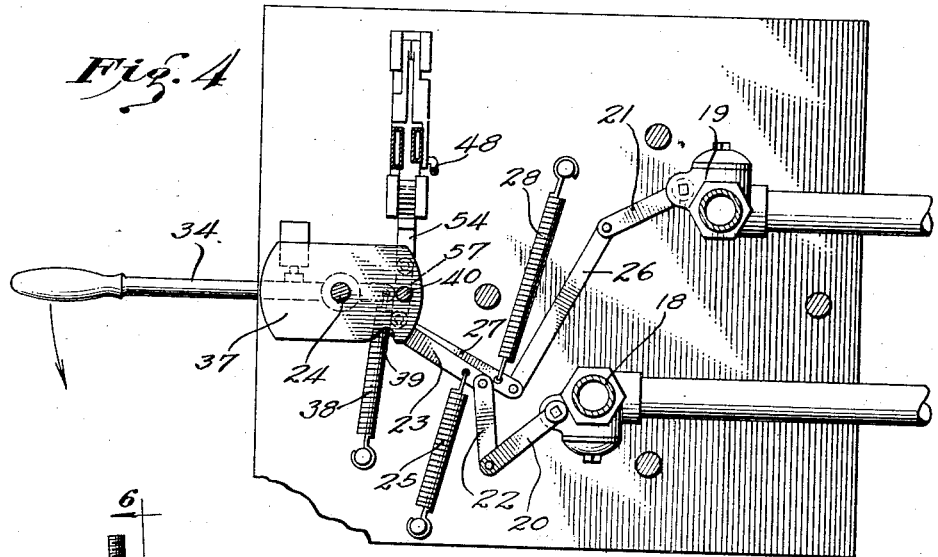
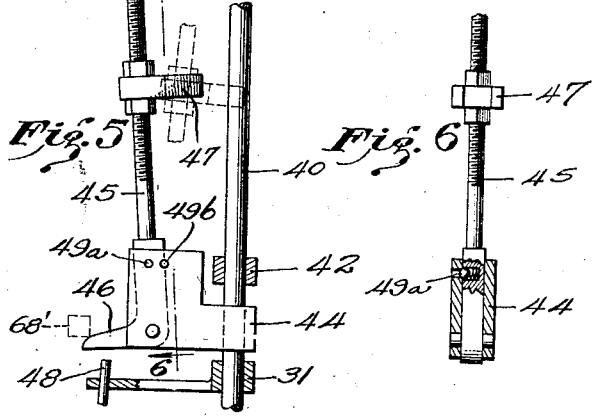
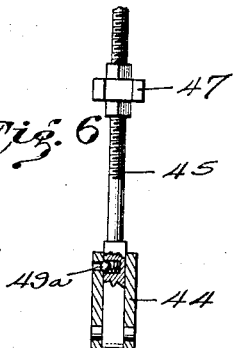
INVENTOR
Louis Schechter
BY Westall and Wallace
ATTORNEYS Sept. 8, 1931. L. SCHECHTER 1,822,241
GASOLINE DISPENSER
Filed Sept. 29, 1930 4 Sheets-Sheet 4
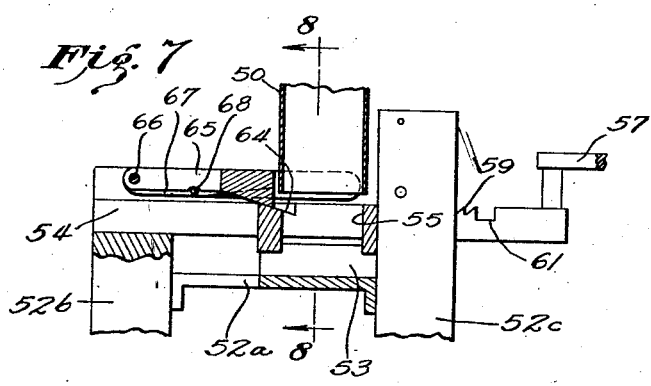
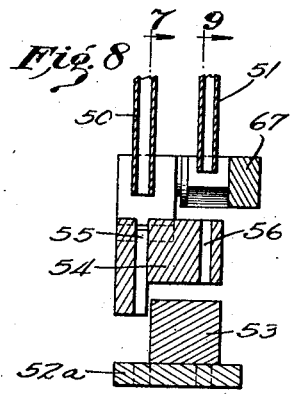
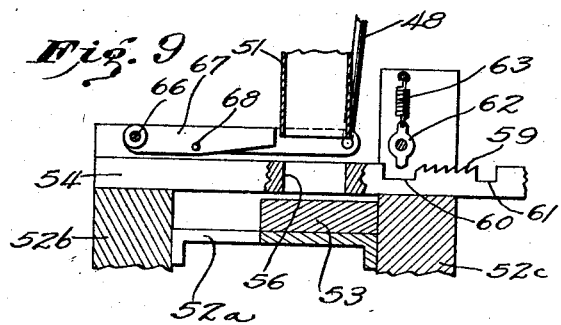
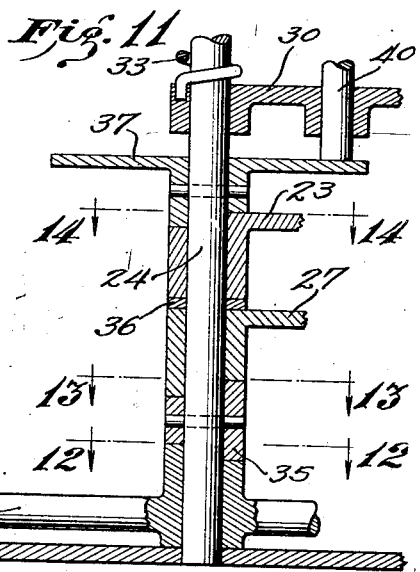
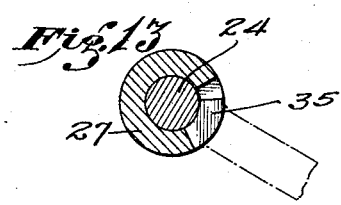
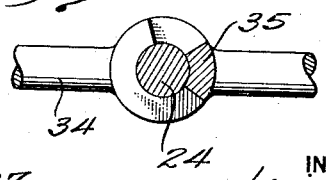
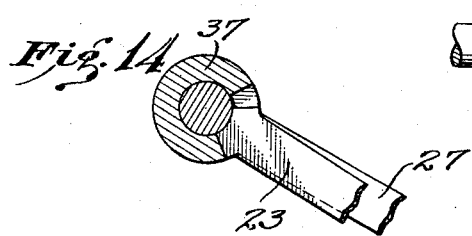
INVENTOR
Louis Schechter
BY Westall and Wallace
ATTORNEYS Patented Sept. 8, 1931

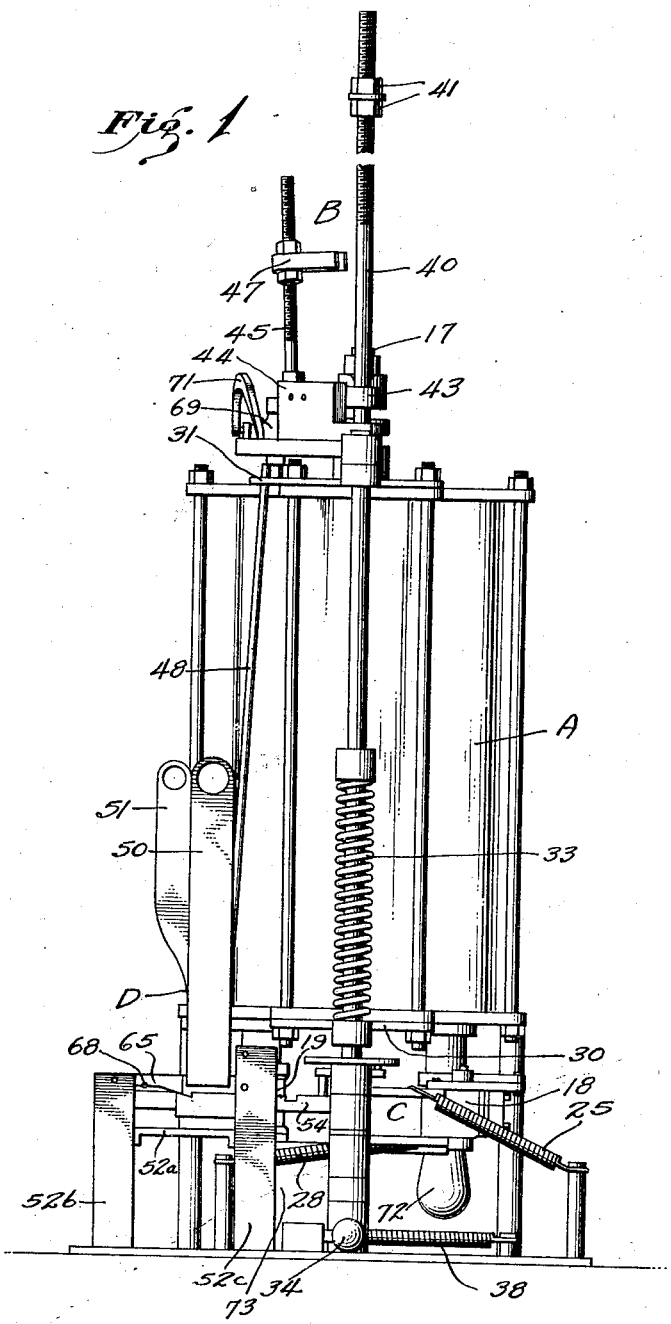

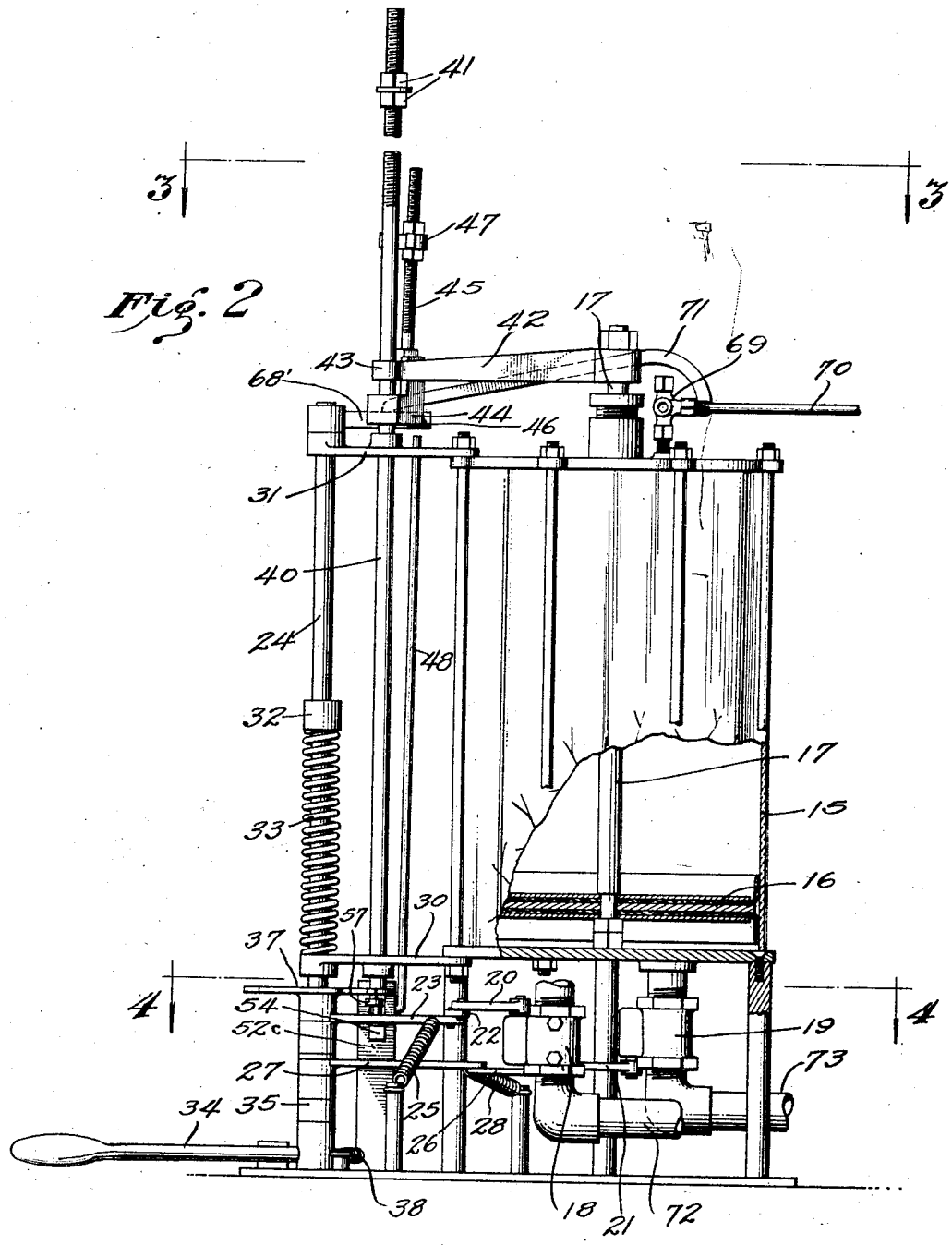

1,822,241

UNITED STATES PATENT OFFICE

LOUIS SCHECHTER, OF LOS ANGELES, CALIFORNIA

GASOLINE DISPENSER

Application filed September 29, 1930. Serial No. 484,960.

This invention relates to a liquid dispensing machine, and the particular embodiment disclosed herein is intended for dispensing predetermined quantities of gasoline.

An object of this invention is to provide a dispenser which may be controlled by a coin and which on operation will take into a measuring compartment a predetermined quantity of liquid and then deliver the liquid, the measuring compartment being normally empty. Another object of this invention is to provide time control mechanism whereby either of two predetermined quantities of liquid will be delivered dependent on the coin inserted to operate the mechanism. In addition to the broader objects of this invention, there are certain details of design and structure whereby an accurate measuring device, simple and compact in construction and readily adjustable for variation in quantities of liquid delivered may be obtained.

These objects together with other objects and corresponding accomplishments are obtained by means of the embodiment of my invention illustrated in the accompanying drawings, in which:—

Fig. 1 is a face view in elevation of the dispenser; Fig. 2 is a side elevation, a portion of the cylinder being broken away and shown in section; Fig. 3 is a plan view as seen on the line 3—3 of Fig. 2; Fig. 4 is a section as seen on the line 4—4 of Fig. 2; Fig. 5 is an elevation of one of the stops; Fig. 6 is a section as seen on the line 6—6 of Fig. 5; Fig. 7 is a portion of the coin control showing one of the coin chutes and associated mechanism; Fig. 8 is a section as seen on the line 8—8 of Fig. 7; Fig. 9 is a view similar to Fig. 7 as seen on the line 9—9 of Fig. 8 and showing the other chute and its associated mechanism; Fig. 10 is a section in plan to the structure shown in Fig. 8; Fig. 11 is an enlarged view showing details of the operating lever and its mounting with portions of the valve linkage; and Figs. 12, 13, and 14 are sections as seen on the lines correspondingly numbered in Fig. 11.

Referring with more particularity to Fig. 1, the measuring and delivery cylinder is indicated by A. Above the cylinder is the stop mechanism indicated generally by B. Below the cylinder is the liquid intake and delivery control mechanism marked C and operable by a handle. At one side of the cylinder is the coin control marked D.

The cylinder is mounted in any suitable manner upon a base and is marked 15. Reciprocably mounted in the cylinder so as to float therein is a piston 16 having a rod 17 extending through the top of the cylinder. The cylinder is divided into an upper motor end and a lower pump end. Connected to the cylinder to the lower head and by means of suitable piping is an oscillatable inlet valve 18 and a similar outlet valve 19. These valves have operating arms marked respectively 20 and 21. Each valve has an open and a closed position. Arm 20 is secured by connecting link 22 to an arm 23 loosely mounted on a shaft 24. A tension spring 25 tends to hold arm 23 in a position with valve 18 closed. A connecting link 26 secures arm 21 of valve 19 to arm 27 loosely mounted on shaft 24. A tension spring 28 is secured to arm 27 and tends to hold valve 19 in open position.

Shaft 24 is pivotally mounted in a bearing plate 30 secured to the frame of the cylinder and is journalled in the base of the dispenser mounting as well as at the top in a plate marked 31. A collar 32 is fixed to shaft 24 and receives the end of a torsion string 33 and is secured at its other end to the bearing plate 30. Loosely mounted upon shaft 24 is an operating lever or handle 34. Intermediate hubs of the lever 34 and arm 27 is a sleeve 35 pinned to shaft 24 and having a tongue to engage with shoulders on the lever as best shown in Figs. 11 and 12. The sleeve 35 on its upper end has an axially extending tongue for engagement with axially extending shoulders on the hubs of arm 27 as shown in Figs. 11 and 13. A separation washer 36 is disposed between the hubs of arms 23 and 27, and secured to the shaft 24 is a face plate 37 having a hub with a tongue for engagement with shoulders on the hubs of arms 23. An extension of lever 34 is secured by a tension spring 38 tending to hold the lever in the position shown in Fig. 4. In one side of face plate 37 is a notch 39 for engagement with a stem. Mounted in bored bosses in plates 30 and 31 is a stem 40 which may have a limited reciprocating movement. The lower end of stem 40 may either rest upon face plate 37 as shown in Fig. 11 or may overlap the face plate and rest in notch 39 when the lever is swung in the direction indicated by the arrow in Fig. 4. The stem 40 constitutes a latch for the lever 34, and the face plate 37 constitutes a keeper. The upper end of stem 40 is threaded to receive stop nuts 41 which may be adjustably positioned thereon.

Mounted upon piston rod 17 is an abutment arm 42 extending laterally and having a hub 43 through which rod 40 may slide. Secured on the rod 40 is a block 44, best shown in Fig. 5. Block 44 has a recess and pivotally secured thereto and mounted in the recess is a rod 45 having a finger 46. The upper end of rod 45 is threaded and mounted thereon between nuts is a forked stop 47 adapted to embrace the stem 40 and act as a stop as in the case of nuts 41. A tappet rod 48 is disposed below finger 46 for engagement of the latter. Detents 49a and 49b are mounted in the rod 45 coacting with sockets in block 44 and when engaged tending to hold the rod either in position away from stem 40 as shown in Fig. 5 in full lines or nearer stem 40 with the stop 47 engaging the rod as shown in dotted lines. Rod 48 is connected at its lower end to the coin controlled mechanism.

The coin controlled mechanism is best shown in Figs. 4 and 7 to 10. Chutes for coins are marked 50 and 51. For illustrative purposes, chute 50 accommodates a fifty cent piece and chute 51 a twenty-five cent piece. There may be incorporated in the coin control, suitable coin selection and rejection mechanism forming no part of the present invention and not shown herein. A frame has a rail bar 52a spanning two posts 52b and 52c and a rail block 53 is mounted thereon in such a manner that the bar 52a is in vertical alinement with the chute 50 and the rail block is in alinement with chute 51. Slidably mounted in the frame is a slide bar 54 having a section disposed to underly chutes 50 and 51. In the slide bar are coin slots 55 and 56 disposed for alinement with chutes 50 and 51. A coin passing from chute 50 enters coin slot 55 and rests upon the rail bar 52a and a coin from chute 51 will pass into coin slot 56 and rest upon the rail block 53. The slide bar 54 has an extension which is connected by a pin to a connecting link 57 which is pivotally attached at its other end to the face plate 37. Obviously, swinging of the lever 34 can be controlled by a slide bar 54. The frame post 52b is slotted so that the slide bar 54 may work therein and the bar is provided with ratchet teeth 59 with turning recesses 60 and 61 at the ends of the ratchet. Pivotally mounted in a post 52c is a dog 62. A tension spring 63 holds the dog so that in association with the ratchet, it constitutes a reversing ratchet and dog. The arrangement is such that if the slide bar 54 is moved to the left, positions shown in Figs. 7 to 10 the dog 62 will ride over the ratchet in such a manner as to prevent retrograde movement of the slide bar until the dog has reached the recess 61, the slide bar having made a full stroke, whereupon, the dog may turn and the slide bar be returned. Bar 54 has a notch 64 adjacent the slot 55 serving as a catch for a keeper lever 65. Keeper lever 65 is pivotally mounted on the post 52b and the arrangement is such that the catch lever will obstruct movement of slide bar 54 unless raised. When a coin such as a fifty-cent piece is disposed in coin slot 55, it will act as a cam to lift the catch lever so that it will clear the notch 64 and enable sliding of the bar 54. A lever 67 is disposed in alinement with chute 51 having an end so disposed that it will be lifted by a coin such as a quarter in slot 56. Projecting from one side of lever 67 is a pin 68 which underlies the catch lever 65 so that upon raising of the lever 67, the catch lever will be raised. Thus, if there is a coin in slot 56, the slide bar will be released. Lever 67 has an extension to which rod 48 is secured. It is obvious that upon a coin being deposited into slot 56, movement of the slide bar will cause release of the slide bar and also will raise the tappet rod 48, the latter engaging finger 46 and swinging stop lever 45 into position to be engaged by the arm 42. The arrangement is such that a smaller coin in value will by reason of stop 47 cause the piston to rise less than when the arm 42 engages stop 41. The detent 49b will hold the stop lever in operative position until it is engaged by a finger 68' secured to shaft 24 so as to be revolved therewith. Finger 68' is so disposed that when in inoperative position of lever handle 34, it will engage the upper surface of finger 46. This causes the stop lever 45 to be returned to inoperative position as shown in Fig. 5 and detent 49a will hold it in this position.

At the motor end of cylinder 15 is a three way valve 69 having a pressure line 70 leading to a source of fluid pressure such as an air line. It also has an exhaust so that in one position of valve 69 the motor end of the cylinder is connected to air under pressure and in the other position to exhaust. A link connected to the stem of valve 69 is secured to arm 68'. The parts are arranged so that when lever 34 is in inoperative position as shown in Fig. 4, the valve 69 connects the motor end of the cylinder 15 to the pressure line 70 and piston 16 is acted upon to move it to its lower position and in operative position of handle 34 the valve 69 connects the motor end of cylinder 15 to the atmosphere or discharge enabling pressure on the side of piston 16 to raise the latter until stopped.

In normal or inoperative position the parts are in the positions shown in full lines in the drawings. The pipe line 72 leading to inlet valve 18 is connected to a source of gasoline under pressure. Pipe line 73 connects to a delivery spout, not shown and flow thereto is controlled by valve 19. A coin is inserted in the proper chute. Assume that a fifty cent piece is inserted in chute 50. The handle 34 may then be swung, release of the handle being effected through slide bar 54. At the end of the movement stem 40 drops into notch 39 of face plate 37 to hold the lever in operative position. The inlet valve 18 will have been opened and discharge valve 19 closed. Gasoline enters by way of pipe 72 forcing piston 16 upward until stopped by nuts 41, thereby raising stem 40 and releasing the lever, which is returned by spring 38, closing the inlet valve 18 and opening the discharge valve 19. At the beginning of upward movement of piston 16, the three way valve 69 will have been opened to discharge relieving pressure on the motor side of the piston and on restoration of the lever 34 to inoperative position, the three way valve will be positioned to admit pressure on piston 16 and discharge of the gasoline contained in the cylinder through pipe 73. The parts are then ready for another operation. If a twenty five cent piece is inserted in chute 51 and handle 34 swung, stop 47 is moved to be engaged by arm 42, the stem 40 lifted and the lever 34 restored. By adjustment of nuts 41 and 47, the amount of gasoline taken into the cylinder and discharged may be adjusted to accord with price. It will be noted that no gasoline is contained in cylinder 15 while the dispenser is inoperative. Suitable cabinets may be provided for gasoline delivery containers and associated mechanism for their delivery.

What I claim is:—

1. A liquid dispenser comprising an upright measuring and delivery cylinder, a floating piston in said cylinder providing a lower pump end, a piston rod extending through the upper head of said cylinder, an inlet and outlet air valve at the upper end of said cylinder, an inlet and an outlet at the pump end of said cylinder, a stem provided with a stop for said rod to limit travel of said piston and determine the volume of liquid to be delivered, said stem being mounted to enable limited travel with said rod and constituting a latch, a valve control lever having a face for disposition under said stem, said stem being positionable by gravity to overlap said lever and lock the latter against swinging movement, a torsion spring tending to hold said lever with its face underlying said stem in release position, means connecting said valve control lever and said air valve to actuate the latter, a coin controlled mechanism to lock and release said lever in its swinging movement, an inlet valve for entrance of liquid to said cylinder and an outlet valve for discharge of liquid therefrom, and linkage connecting said lever and valves to effect alternate opening and closure of the latter, said inlet valve being open in stem locked position of said lever.

2. A liquid dispenser comprising a measuring and delivery cylinder, a floating piston dividing said cylinder into a motor and a pump end, a piston rod extending through a head of said cylinder, an inlet and an outlet at the pump end of said cylinder, a stem provided with a stop for said rod to limit travel of said piston and determine the volume of liquid to be delivered, said stem being mounted to enable limited travel with said rod and constituting a latch, a valve control lever having a face for disposition under said stem, said stem being positionable to overlap said lever and lock the latter against swinging movement, resilient means tending to hold said lever with its face underlying said stem in release position, a coin controlled mechanism to lock and release said lever in its swinging movement, an inlet valve for entrance of liquid to said cylinder and an outlet valve for discharge of liquid therefrom, linkage connecting said lever and valves to effect alternate opening and closure of the latter, said inlet valve being open in stem locked position of said lever, a three way valve connected to the motor end of said cylinder and having a high and a low pressure way, and linkage connecting said lever and three way valve to open said low pressure way and close said high pressure way in stem locked position of said lever.

3. A liquid dispenser comprising a measuring and delivery cylinder, a floating piston in said cylinder providing a lower pump end, a piston rod extending through the upper head of said cylinder and having a lateral abutment arm, an inlet and an outlet at the pump end of said cylinder, an inlet and outlet air valve at the upper end of said cylinder, a stem provided with a stop for said abutment arm to limit travel of said piston and determine the volume of liquid to be delivered, said stem being mounted to enable limited travel with said rod and constituting a latch, a second stop supported by said stem and movable to and from the latter into and out of abutment arm engaging position, a valve control lever having a face for disposition under said stem, said stem being positionable to overlap said lever and lock the latter against swinging movement, resilient means tending to hold said lever with its face underlying said stem in release position, means connecting said valve control lever and said air valve to actuate the latter, a dual coin controlled mechanism to lock and release said lever in its swinging movement, said control having slides, one for each coin, means operated by one of said slides to position said second stop in arm engaging position, an inlet valve for entrance of liquid to said cylinder and an outlet valve for discharge of liquid therefrom, and linkage connecting said lever and valves to effect alternate opening and closure of the latter, said inlet valve being open in stem locked position of said lever.

4. A liquid dispenser comprising a measuring and delivery cylinder, a floating piston dividing said cylinder into a motor and a pump end, a piston rod extending through a head of said cylinder and having a lateral abutment arm, an inlet and an outlet at the pump end of said cylinder, a stem provided with a stop for said abutment arm to limit travel of said piston and determine the volume of liquid to be delivered, said stem being mounted to enable limited travel with said rod and constituting a latch, a second stop supported by said stem and movable thereon to and from the latter into and out of abutment arm engaging position, a valve control lever having a face for disposition under said stem, said stem being positionable to overlap said lever and lock the latter against swinging movement, resilient means tending to hold said lever with its face underlying said stem in release position, a dual coin controlled mechanism to lock and release said lever in its swinging movement, said control having slides, one for each coin, means operated by one of said slides to position said second stop in arm engaging position, an inlet valve for entrance of liquid to said cylinder and an outlet valve for discharge of liquid therefrom, linkage connecting said lever and valves to effect alternate opening and closure of the latter, said inlet valve being open in stem locked position of said lever, a three way valve connected to the motor end of said cylinder and having a high and a low pressure way, and linkage connecting said lever and three way valve to open said low pressure way and close said high pressure way in stem locked position of said lever.

5. A liquid dispenser comprising a measuring and delivery cylinder, a floating piston dividing said cylinder into a motor and a pump end, a piston rod extending through a head of said cylinder and having a lateral abutment arm, an inlet and an outlet at the pump end of said cylinder, a stem provided with a stop for said abutment arm to limit travel of said piston and determine the volume of liquid to be delivered, said stem being mounted to enable limited travel with said rod and constituting a latch, a second stop pivotally supported on said stem and swingable to and from the latter into and out of abutment arm engaging position, a valve control lever having a face for disposition under said stem, said stem being positionable to overlap said lever and lock the latter against swinging movement, a torsion spring tending to hold said lever with its face underlying said stem in release position, a dual coin controlled mechanism to lock and release said lever in its swinging movement, said control having slides one for each coin, means operated by one of said slides to position said second stop in arm engaging position, an inlet valve for entrance of liquid to said cylinder and an outlet valve for discharge of liquid therefrom, linkage connecting said lever and valves to effect alternate opening and closure of the latter, said inlet valve being open in stem locked position of said lever, a three way valve connected to the motor end of said cylinder and having a high and a low pressure way, a shaft fixed to said lever and linkage connecting said shaft and three way valve to open said low pressure way and close said high pressure way in stem locked position of said lever, said shaft having a tappet to engage said second stop and restore it upon release of said lever.

6. A liquid dispenser comprising an upright measuring and delivery cylinder, a floating piston in said cylinder providing a lower pump end, a piston rod extending through the upper head of said cylinder, an inlet and an outlet at the pump end of said cylinder, an inlet and outlet air valve in the upper end of said cylinder, a stem provided with a stop for said rod to limit travel of said piston and determine the volume of liquid to be delivered, said stem being mounted to enable limited travel with said rod and constituting a latch, a valve control lever having a face for disposition under said stem, said stem being positionable by gravity to overlap said lever and lock the latter against swinging movement, means connecting said control lever and said air valve to actuate the latter, a means urging said lever to a position with its face underlying said stem in release position, an inlet valve for entrance of liquid to said cylinder and an outlet valve for discharge of liquid therefrom, and linkage connecting said lever and valves to effect alternate opening and closure of the latter, said inlet valve being open in stem locked position of said lever.

7. A liquid dispenser comprising a measuring and delivery cylinder, a floating piston dividing said cylinder into a motor and a pump end, a piston rod extending through a head of said cylinder, an inlet and an outlet at the pump end of said cylinder, a stem provided with a stop for said rod to limit travel of said piston and determine the volume of liquid to be delivered, said stem being mounted to enable limited travel with said rod and constituting a latch, a valve control lever having a face for disposition under said stem, said stem being positionable to overlap said lever and lock the latter against swinging movement, resilient means tending to hold said lever with its face underlying said stem in release position, an inlet valve for entrance of liquid to said cylinder and an outlet valve for discharge of liquid therefrom, linkage connecting said lever and valves to effect alternate opening and closure of the latter, said inlet valve being open in stem locked position of said lever, a three way valve connected to the motor end of said cylinder and having a high and a low pressure way, and linkage connecting said lever and three way valve to open said low pressure way and close said high pressure way in stem locked position of said lever.

In witness that I claim the foregoing I have hereunto subscribed my name this 18th day of September, 1930.

LOUIS SCHECHTER.